Patented Nov. 12, 1929

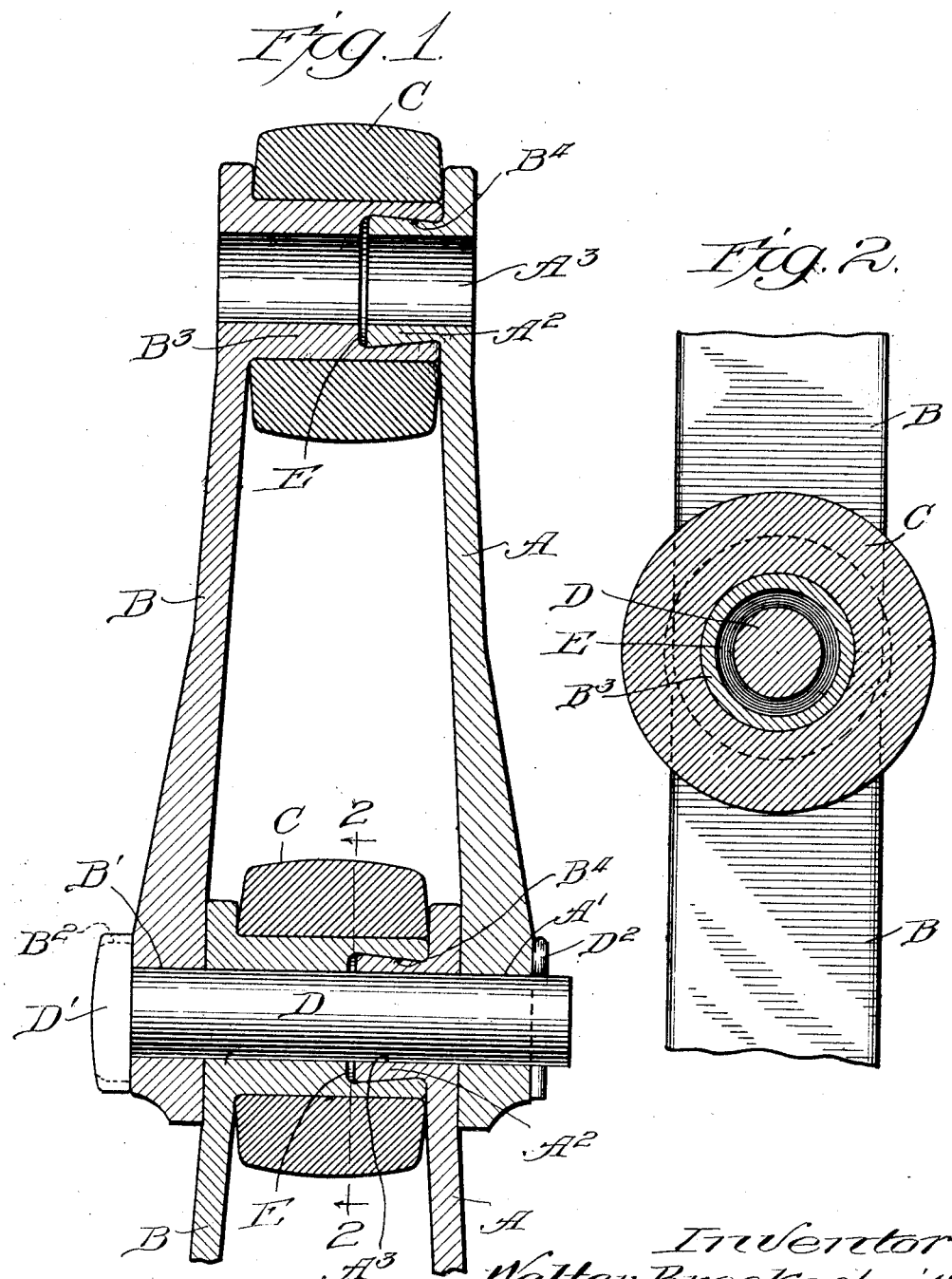

1,734,960

UNITED STATES PATENT OFFICE

WALTER BROCKSCHMIDT, OF MUSKEGON HEIGHTS, MICHIGAN, ASSIGNOR TO LINK-BELT COMPANY, OF CHICAGO, ILLINOIS, A CORPORATION OF ILLINOIS

CHAIN LINK

Application filed November 20, 1924. Serial No. 751,001.

This invention relates to a chain link, and particularly to a chain link adapted to be incorporated in a roller chain. It has for one object to provide a chain link which is made up originally of two parts and which may be forced together with a roller, which two parts thereafter become in effect a unit and form a permanent assembly with the roller. Another object is to provide in such a construction means whereby the roller revolves about a continuous smooth surface. Another object is to provide in such a link means for retaining lubricant within the link, whereby the pin which passes through the link is properly lubricated at all times. Other objects will appear from time to time throughout the specification and claims.

My invention is illustrated more or less diagrammatically in the accompanying drawing, wherein:

Figure 1 is a cross section through a portion of the chain showing one link complete and parts of a second link;

Figure 2 is a cross section taken on line 2—2 of Figure 1.

Like parts are designated by like characters throughout.

A is a link side member. It is provided at one end with a perforation $A^1$ through which a pin passes. At its other end it is provided with a flaring penetrating portion $A^2$ which is perforated as at $A^3$.

B is a link member adapted to be mated with the member A. It is provided at one end with a perforation $B^1$ and with a pair or parallel straight sided projections $B^2$. At its other end it is provided with an enclosing extension member $B^3$. This member is provided with a tapered cavity $B^4$ which has its smallest interior diameter at its outer end. Surrounding the member $B^3$ is a roller C. This roller is adapted freely to rotate upon the member.

D is a pin having a squared head $D^1$. The pin is inserted in the perforation through the link members $B^3$, $A^2$ and the square head $D^1$ bears against the members $B^2$, and rotation of the pin is thus prevented. In its opposite end the pin receives a cotter $D^2$ which prevents withdrawal or displacement.

E is an annular oil pocket or lubricating cavity formed adjacent the inner end of the member $A^2$ within the cavity $B^4$.

Although I have shown an operative device; still it will be obvious that many changes might be made in size, shape and arrangement of parts without departing materially from the spirit of my invention; and I wish, therefore, that my showing be taken as in a sense diagrammatic.

The use and operation of my invention are as follows:

The side members of the link are separately made and are then driven together, the outwardly flaring penetrating member being driven into the surrounding member, and then a drift is preferably driven through the perforations in the two members and the parts are forced in position as shown in Figure 1. In this position they form in effect an integral member. The length of the penetrating member with relation to the large cavity in the enclosing member is such that an annular lubricant retaining pocket is formed. The roller resting about the surrounding member $B^3$ is free to rotate upon it and has a smooth and continuous surface upon which it is rotated. The parts are thus permanently assembled, binding of the roller upon the member which carries it is impossible and lubrication of the pin within the link is made certain.

I claim:

1. In combination in a chain link, a pair of link members each having a side portion and a laterally extending tubular portion, one of said members provided in its bore with an inwardly tapered enlargement, and the other member adapted to be driven into said enlargement and to be spread laterally thereinto, the enclosing member extending substantially to the side portion of the other member.

2. In combination in a chain link, a pair of link members each having a side portion and a laterally extending tubular portion, one of said members provided in its bore with an inwardly tapered enlargement, the other member adapted to be driven into said enlargement and to be spread laterally thereinto, the penetrating member stopping short of the inner end of the tapered enlargement and forming therewith an oil retaining ring, the enclosing member extending substantially to the side portion of the other member.

3. In combination in a chain link, a pair of link members each having a side portion and a laterally extending tubular portion, one of said members provided in its bore with an inwardly tapered enlargement, the other member adapted to be driven into said enlargement and to be spread laterally thereinto, the penetrating member stopping short of the inner end of the tapered enlargement and forming therewith an oil retaining ring, the enclosing member extending substantially to the side portion of the other member, and having a roller positioned thereupon and adapted to rotate thereabout.

4. In combination in a chain link, a pair of link members each having a side portion and a laterally extending tubular portion, the tubular part of one of said members being tapered, the thinnest part being at the side members, the other member provided in its bore with an inwardly tapered enlargement, the first mentioned member adapted to be driven into said enlargement and to be spread laterally thereinto, the enclosing member extending substantially to the side portion of the other member.

5. In combination in a chain link, a pair of link members each having a side portion and a laterally extending tubular portion, the tubular part of one of said members being tapered, the thinnest part being at the side member, the other member provided in its bore with an inwardly tapered enlargement, the first mentioned member adapted to be driven into said enlargement and to be spread laterally thereinto, and to stop short of the inner end thereof and to form therewith an oil retaining ring.

6. In combination in a chain link, a pair of link members each having a side portion and a laterally extending tubular portion, the tubular part of one of said members being tapered, the thinnest part being at the side member, the other member provided in its bore with an inwardly tapered enlargement, the first mentioned member adapted to be driven into said enlargement and to be spread laterally thereinto, and to stop short of the inner end thereof and to form therewith an oil retaining ring, the enclosing member extending substantially to the side portion of the first mentioned member, and a roller mounted upon and adapted to rotate about said enclosing member.

7. In combination in a chain link a pair of separately formed link side members each having a laterally extending tubular portion, one of such portions being provided with an inwardly flaring enlargement in its bore, the other tubular portion being adapted to be forced into and permanently seated within such enlargement, the outer tubular portion completely enclosing the inner tubular portion throughout its length and extending substantially to the side portion of the opposite link member whereby a smooth and uninterrupted outer bearing surface is provided.

Signed at city of Muskegon, county of Muskegon and State of Michigan, this 8th day of November, 1924.

WALTER BROCKSCHMIDT.